United States Patent [19]

Bundschuh

[11] 4,006,792
[45] Feb. 8, 1977

[54] STEERING SYSTEM WITH AUXILIARY POWER ASSIST
[75] Inventor: Albert Bundschuh, Waldstetten, Germany
[73] Assignee: Zahnradfabrik Friedrichshafen AG, Friedrichshafen, Germany
[22] Filed: Oct. 29, 1975
[21] Appl. No.: 626,771
[52] U.S. Cl. .............................. 180/143; 91/434; 137/625.26
[51] Int. Cl.² .......................................... B62D 5/08
[58] Field of Search .......... 180/141, 143, 146, 147; 91/434, 375 A; 137/625.26

[56] References Cited
UNITED STATES PATENTS

| 2,894,525 | 7/1959 | Erickson | 180/147 X |
| 2,996,136 | 8/1961 | Nallinger et al. | 180/143 |
| 3,314,495 | 4/1967 | Clark et al. | 180/143 |
| 3,433,127 | 3/1969 | Thompson | 91/375 A |

Primary Examiner—Joseph F. Peters, Jr.
Assistant Examiner—John A. Pekar
Attorney, Agent, or Firm—Zalkind & Shuster

[57] ABSTRACT

A steering control valve displaced from a neutral position by the manual effort applied to a hand steering wheel, against the bias of a torsion spring, controls the supply of fluid from a servo pump to a steering servo motor with a flow rate that varies as an inverse function of the pump operating speed. Variable flow throttling passages associated with the control valve regulate the servo motor operating pressure and limit the maximum manual effort required for steering purposes under all operating conditions.

5 Claims, 6 Drawing Figures

STEERING SYSTEM WITH AUXILIARY POWER ASSIST

BACKGROUND OF THE INVENTION

This invention relates to an auxiliary power assist for vehicle steering systems wherein the manual effort or steering force requirements of the driver are maintained low under different driving conditions.

Prior art steering systems with auxiliary power assist arrangements operate to require a greater driver steering force in the deflection zone adjacent the center position as compared to the deflection zones remote from the center position of the hand steering wheel. This force characteristic serves to center the steering wheel to provide the driver with an adequate driving feel. Such a steering arrangement has been disclosed, for example, in U.S. Pat. No. 3,180,233.

One of the disadvantages of such prior steering systems is the higher steering effort required during parking maneuvers at a very low speed.

It is therefore an important object of the present invention to provide a steering system of the aforementioned type wherein the increased manual steering effort required during low speed operations such as parking, is reduced despite the high steering resistance of the wheels of the vehicle, and wherein the manual steering force required at the hand steering wheel during higher speed operations nevertheless increases sharply with increasing steering resistance.

In the steering system disclosed in U.S. Pat. No. 3,833,081, the steering force increases with the speed of the vehicle because of a liquid pressure output of a second special pump, said output rising proportionally to the speed of the vehicle. As a result of such an arrangement only a small manual force is required during low speed travel. The provision of a special pump involves however, an undesirable high cost for construction and installation. It is therefore an additional object of the present invention is to provide a more desirable manual force characteristic without the use of additional pumps.

SUMMARY OF THE INVENTION

In accordance with the present invention an engine driven servo pump supplies pressurized fluid to the opposing chambers of a piston type servo motor under control of a valve that is displaced from a neutral position by a manual force against the bias of a torsion spring, the valve being provided with means to regulate the servo operating pressure of the fluid so as to decrease the volumetric outflow rate of the servo pump as an inverse function of its operating speed. The steering force thereby hydraulically generated by the servo motor is such as to require a manual displacing force for the control valve that is limited to a relatively low value under all vehicle operating conditions. Regulating formations on the control valve variably throttle the return flow of fluid to the reservoir from the servo pump in order to obtain the desired servo operating pressure and pump output flow rate relationship to pump operating speed.

BRIEF DESCRIPTION OF THE DRAWING FIGURES

DETAILED DESCRIPTION OF PREFERRED EMBODIMENTS

Figure 1:
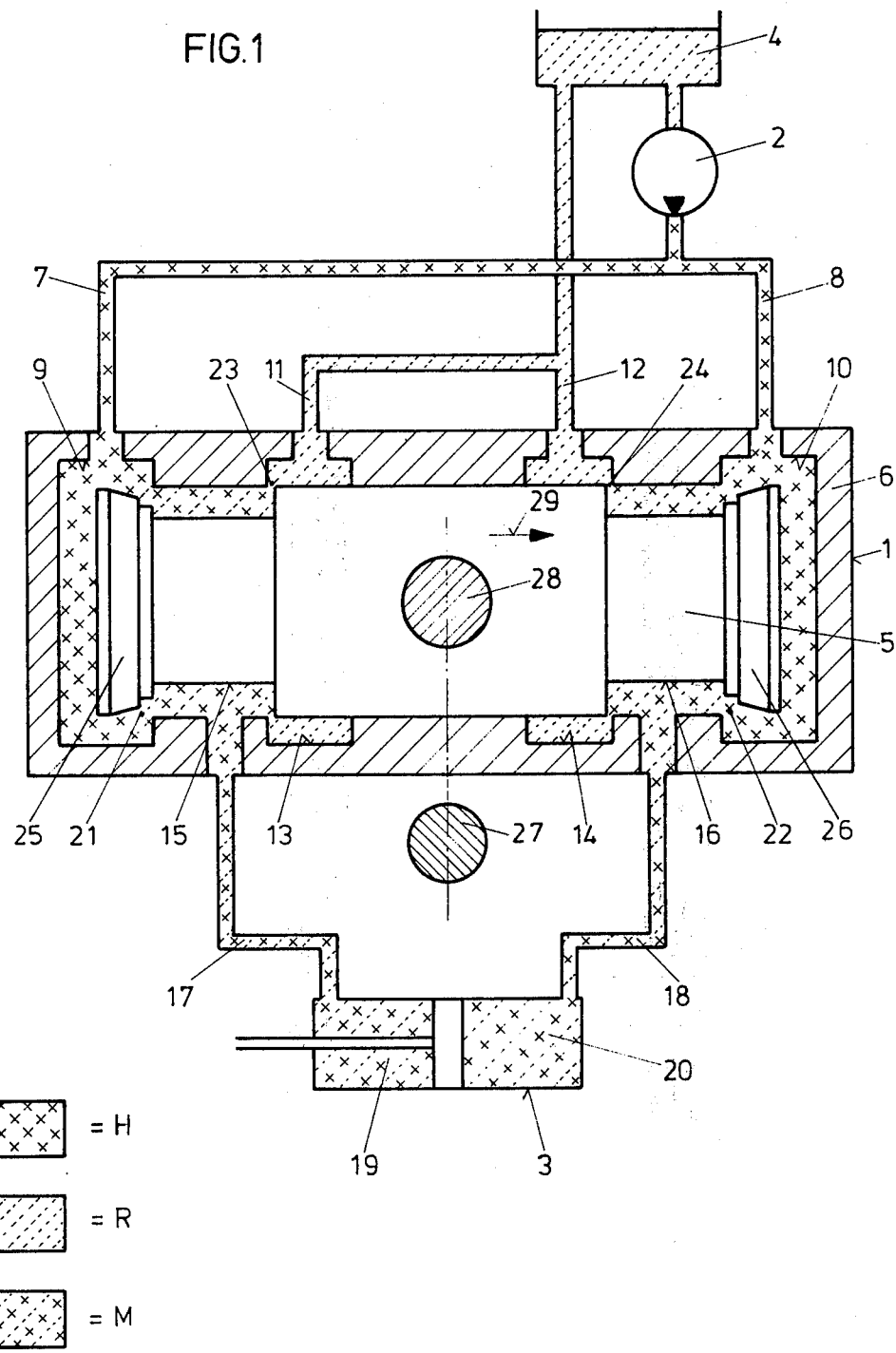
FIG. 1 is a fluid circuit diagram showing a steering system in accordance with the present invention, in a neutral position.
Figure 6:
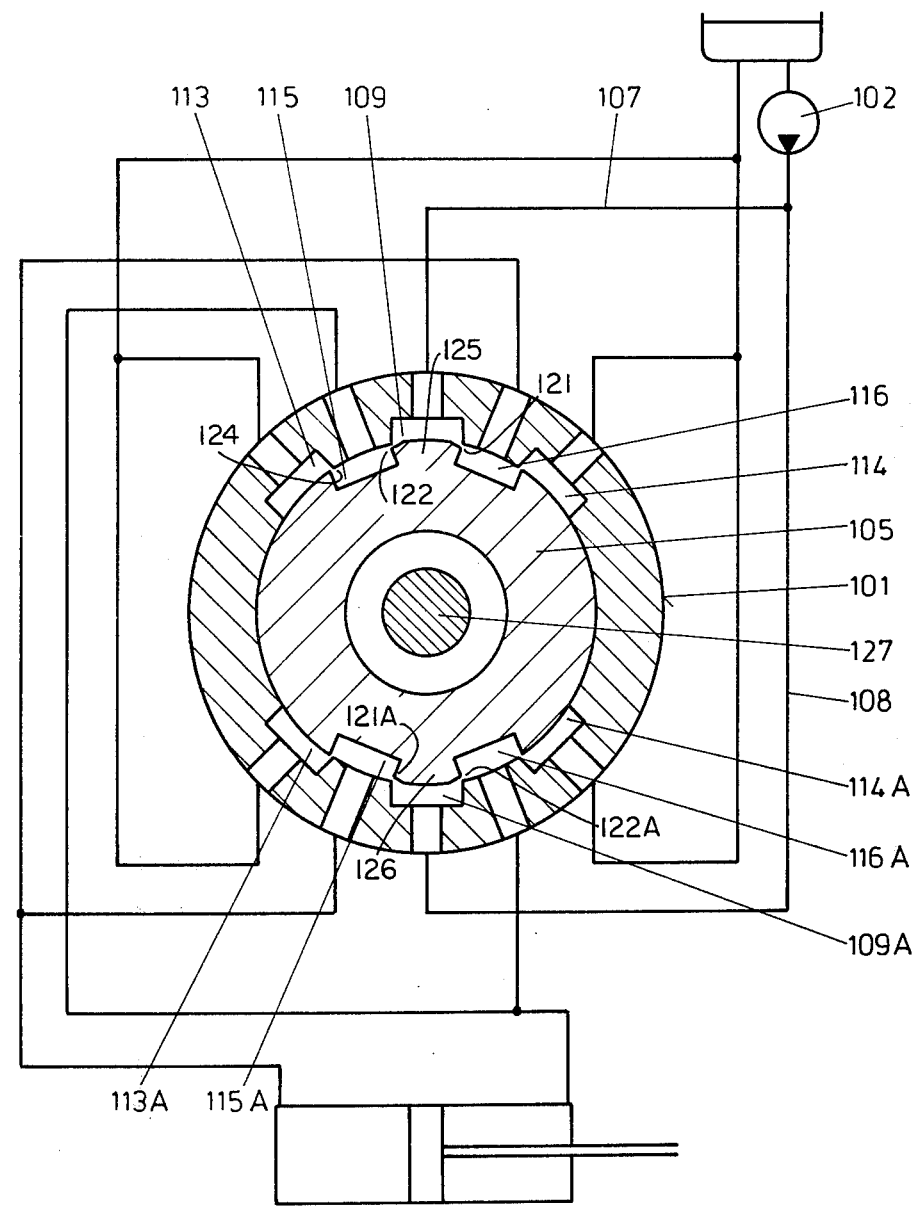
FIG. 6 is a fluid circuit diagram showing another embodiment of the invention.

Referring now to the drawings in detail, FIG. 1 illustrates a fluid circuit for one embodiment of a steering system having high, low and intermediate fluid pressures respectively denoted by symbolized cross-hatching labeled H, R and M in a legend at the lower left hand corner of FIG. 1. The fluid circuit shown consists essentially of a control valve assembly, an engine driven servo pump 2, a servo motor 3 and a reservoir tank 4 for the pressure medium. For the sake of simplicity, the control valve assembly 1, is shown with only one control valve piston 5. However, a control valve assembly with two separate valve pistons is also contemplated as shown for example in U.S. Pat. No. 3,180,233. In the latter patent, the mechanical parts of the steering system are also shown including a steering worm gear a ball nut drive and a steering shaft. These parts are not essential for an understanding of the present invention and are moreover well known to persons skilled in the art and, therefore, are not described herein. It is also possible to utilize a control valve assembly having a rotary slide, as shown for example in U.S. Pat. No 3,887,308, in connection with an embodiment of the invention as shown in FIG. 6 to be described hereafter.

The control valve assembly 1 has two inlet annular ports 9 and 10 formed in a valve body 6, the inlet ports being connected to a servo pump 2 by means of inlet lines 7 and 8 and two annular exhaust ports 13 and 14 connected to the reservoir tank 4 by means of return lines 11 and 12. Two control grooves 15 and 16 formed in the control valve piston 5 communicate through outlet ports with two pressure chambers 19 and 20 respectively in the servo motor 3 by means of pressure lines 17 and 18. Inlet control passages 21 and 22 are formed axially between the control grooves 15 and 16 and the inlet ports 9 and 10. Exhaust control passages 23 and 24 are axially disposed between the control grooves 15 and 16 and the exhaust ports 13 and 14. The inlet passages 21 and 22 are larger than the exhaust passages 23 and 24. The control valve piston 5 at its control edges forming the inlet control passages 21 and 22, have regulating formations 25 and 26 which are formed for example by bevel surfaces. In the neutral position of the control valve piston 5, both the inlet and exhaust passages are opened to the same extent so that the pressure medium may circulate between the servo pump and the reservoir tank.

The control valve piston 5 is axially displaced in response to turning of the hand steering wheel (not shown) by means of an actuator peg 28 connected to the steering wheel by a steering spindle (not shown) to which a torsion bar spring 27 is connected as shown in cross section. The arrangement and connection of the torsion bar spring 27 and the peg 28 is well known to persons skilled in the art as described for example in U.S. Pat. No. 3,180,233 aforementioned. The force characteristic of the torsion bar spring 27 in the neutral position of the control valve example 1 is zero and rises therefrom sharply as the valve piston is shifted. Displacement of the control valve piston 5 is proportional to the angle of torsional strain of the torsion bar spring 27 so that with an increasing displacement of the control valve piston 5, a rising resisting force can be felt on the hand steering wheel produced by the torsional stress of the torsion bar spring 27. Thus, a small hand steering force corresponds to a small displacement of the control valve piston 5 while a large hand steering force corresponds to a large displacement.

With increasing shift of the control valve piston in the direction of arrow 29 for example, one of the inlet control passages 21 is throttled or restricted to control the return flow of the fluid from the servo pump while the other inlet control passage 22 is enlarged to supply fluid under operating pressure to the control groove 16 and expanding chamber 20. The throttled inlet control passage 21 regulates the operating pressure in the inlet lines 7 and 8 and in the control groove 16 separated from the exhaust groove 14 in response to initial displacement of the valve piston 5. The exhaust control passage 23 at the same time is enlarged.

In the event of a large steering resistance, which occurs for example during parking movements of the vehicle being steered, a greater force was heretofore required to displace the control valve piston 5 as compared to the force necessary for the small steering resistance encountered during rapid travel. This force characteristic is dictated by the required servo pressure regulation for a constant flow of pressure medium. Thus, during parking a greater hand steering force must be exerted than in the case of fast travel. During steering maneuvers in the low speed travel range, as in the case of parking, the necessity for exerting a large force on the hand steering wheel makes the parking maneuver difficult. The necessary force could be reduced by a reduction in the torsion angle of the torsion bar spring corresponding to steering wheel deflection and the consequential reduction in displacement of the control valve piston. However, a larger quantity of pressure medium will then be needed in order to obtain the requisite pressure build-up in the servo motor 3 since the inlet control passage 21 remains relatively large. The increased quantity of pressure medium could be delivered by a pump with a high fluid displacement capacity. However, during high speed travel the high quantity of pressure medium and the auxiliary power assist force incident thereto results in a poor road feel because of the very small manual steering force.

Figure 4:
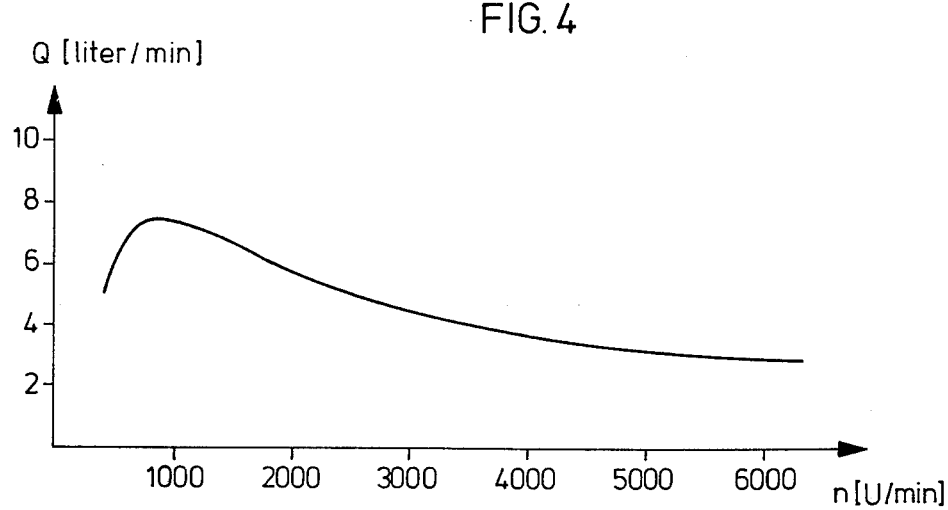
FIG. 4 is a graph depicting the volumetric flow characteristic of the servo pump in the steering system of the present invention.

According to the present invention, the servo pump 2 is operated with an output volumetric flow characteristic that is inversely related to the speed of the pump. Thus, the pump delivers a large volumetric quantity of pressure medium sufficient for steering maneuvers despite large steering deflections and steering resistance. However, the flow quantity decreases with rising pump speed so that in the high speed range of travel, only a small quantity of fluid medium is available. FIG. 4 shows a curve 28 which depicts the relationship between the fluid flow rate of the servo pump output Q and the pump operational speed $n$. Pumps operating in such a manner under control of a pump regulating valve are known per se as disclosed, for example, in U.S. Pat. No. 3,207,077.

Figure 2:
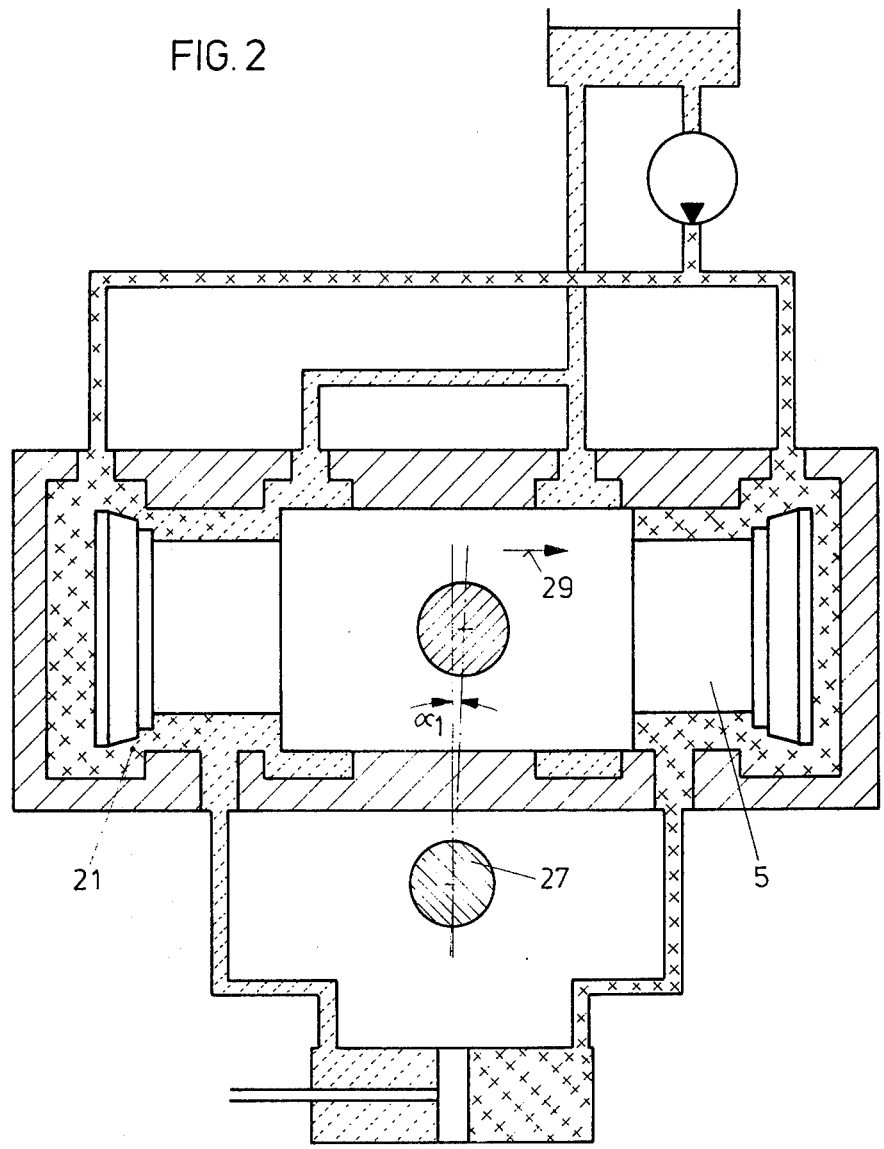
FIGS. 2 and 3 are fluid circuit diagrams showing the steering system of FIG. 1 in shifted positions.

In FIG. 2, the control valve assembly 1 is shown in a shifted state under a low speed running condition of the vehicle engine. Where a large quantity of pressure medium is available, a small displacement of the control valve piston 5 is sufficient to regulate the required servo operating pressure despite the relatively large inlet control passage 21. A relatively low torsion angle $\alpha_1$ of the torsion bar spring 27 corresponds to this small displacement of the control valve piston 5 produced by a low manual steering force. This manual steering force rises slowly since the increasing torsion of the torsion bar spring 27 and the decreasing flow area of the inlet control passage 21 produces a higher servo pressure to increase the hydraulically produced steering force.

Figure 3:
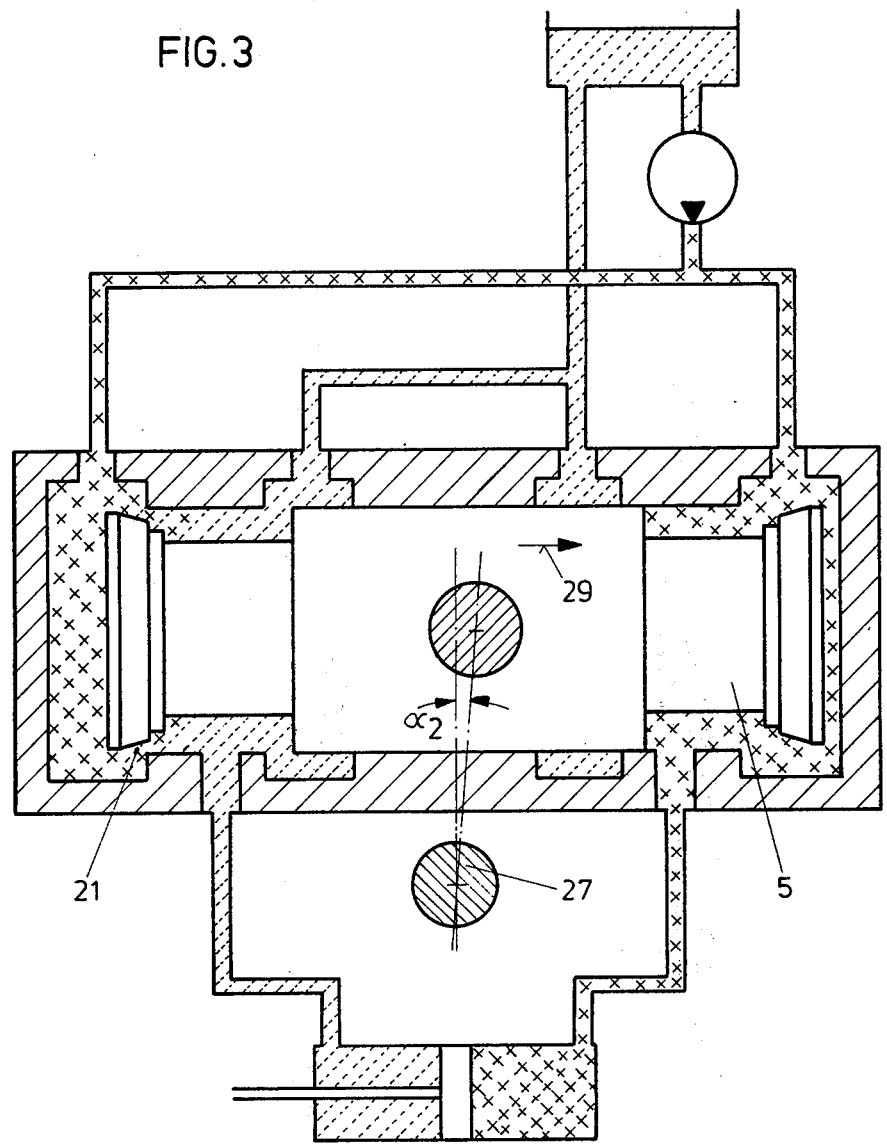

FIG. 3 shows the control valve assembly 1 in a shifted state under a high speed running engine condition. As a result of the lower quantity of pressure medium available in this condition because of its inverse relationship to pump speed as aforementioned, it will be necessary to more forceably displace the control valve piston 5 in order to achieve the requisite pressure build-up even though inlet control passage 21 is more restricted. The increased displacement of the control valve piston 5 therefore has a larger torsion angle $\alpha_2$ of the torsion bar spring 27 associated therewith. This larger torsion angle increases the hand steering force required with increasing pump speed.

If the steering resistance during parking maneuvers increases, then the displacement of the control valve piston 5 as shown in FIG. 2 is no longer sufficient to achieve the servo pressure necessary to overcome the steering resistance. The control valve piston must then be shifted further in the direction of the arrow 29 until the inlet control passage 21 is completely closed. The corresponding torsion angle of the torsion bar spring 27 is maximum at this position of the control valve piston 5 so that no further increase in torsion occurs thereafter with no further rise in the manual steering force. Any further increase in servo pressure depends only on the magnitude of the steering resistance.

Figure 5:
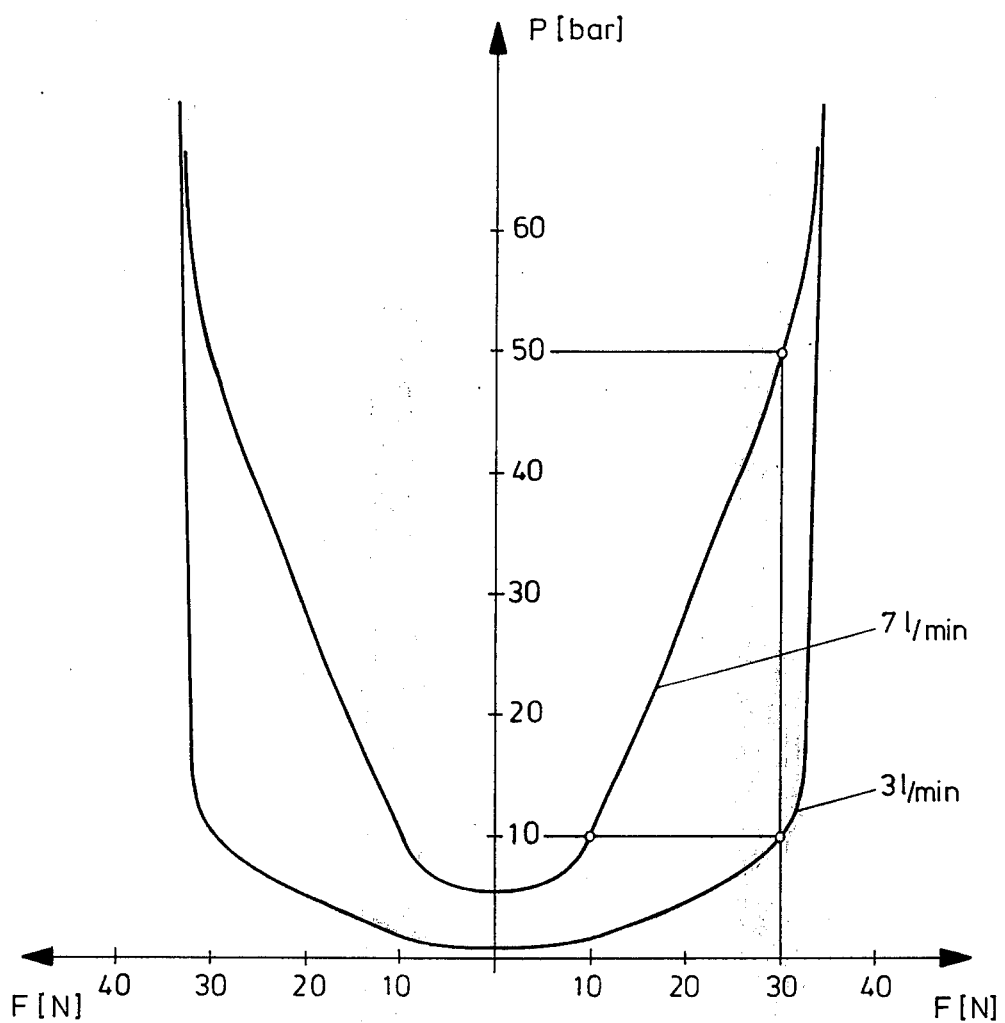
FIG. 5 is a graph showing the relationship between the driver steering force and the servo pump pressure.

FIG. 5 shows a graph of the manual steering force exerted on the hand steering wheel in relation to the servo pressure. The servo pressure is proportional to the steering resistance. The upper curve 30 shows the force relationship for a low pump speed and correspondingly large flow rate while the lower curve 32 shows the relationship for a high pump speed and a correspondingly low flow rate. The limits of displacement of the control valve piston are represented by the points 34 and 36 where the curves begin to approach the vertical asymptotes. The two curves 30 and 32 are depicted in the graph of FIG. 5 as examples to explain typical parameters of the steering system as follows:

1. In order to regulate a pressure of 10 Bar a force of 10 Newton is required under a low speed condition. In the case of a high speed condition with a low flow rate, a force of 30 Newton is required.
2. With a force of 30 Newton for a flow rate of 3 liters per minute, only a pressure of 10 Bar can be regulated whereas a pressure of about 50 Bar will be attained for a flow rate of 7 liters per minute. Therefore, when parking, the pressure level achieved will be approximately 5 times the force exerted on the hand steering wheel to overcome the steering resistance with a force multiplied 5 times.

With respect to rapid travel of a vehicle, the steering resistances are so low that the cut off point at which the inlet control passage 21 is closed will not be reached.

Therefore, a continuous rise in the hand steering force on the hand steering wheel in accordance with curve 32 of FIG. 5 will be sensed by the driver throughout the entire steering range.

Another embodiment of the steering system is shown in FIG. 6 wherein the axially shiftable control valve piston 5 is replaced by a rotary valve assembly 101 having a rotary valve operating piston 105 that is rotatable about a fixed rotational axis. Parts shown in FIG. 6 are referred to by the same reference numerals assigned to corresponding parts in FIG. 1, increased by 100. Thus, the control grooves 115, 116, 116a and 115a associated with the rotary valve piston 105, extend parallel to the rotational axis along the periphery of the rotary valve 105 and internally of the cylindrical housing 106. The pressure medium is conducted to the two inlet ports 109 and 109a from the servo pump 102 by means of inlet lines 107 and 108. In the control positions shown, the inlet grooves 109 and 109a are connected by means of two control grooves 115 and 116 or 115a and 116a respectively with exhaust ports 113 and 114 or 113a and 114a. Flow throttling formations 125 and 126 are arranged on the control edges of the rotary valve piston 105 to form control passages 121, 121a and 122, 122a between the inlet ports and the control grooves. A torsion bar spring 127 is disposed centrally within the rotary valve 105. The valve assembly 101 corresponds in its method of operation and functional arrangement of pressure lines to the control valve assembly 1 so that the previous operational description of the system is applicable hereto.

An important advantage of the present invention resides in the fact that steering force applied to the vehicle wheels is dependent on a servo pump outlet flow rate that is inversely proportional to its operational speed to provide a steering system wherein the manual effort or required hand steering force is a function of the engine speed.

I claim:

1. In combination with a vehicle steering system having an engine driven servo pump (2 or 102) supplying fluid at a flow rate that is an inverse function of engine speed above a predetermined value, at least one control valve (5 or 105) through which the fluid is supplied to a servo motor (3), a torsion spring connected to the control valve for resisting displacement thereof with an increasing bias (27 or 127) and means (28) to which a manual effort is applied for displacing the control valve against the bias of said torsion spring, the improvement including flow regulating surface means (25, 26, or 125, 126) formed on the control valve for varying the output flow rate to the servo motor as a function of displacement of the control valve, whereby the manual effort required to meet increasing steering resistance at engine speeds above said predetermined value increases more rapidly than the increase in the steering effort at engine speeds below said predetermined value.

2. The combination of claim 1, wherein said control valve includes an axially displaceable valve operating piston (5).

3. The combination of claim 1, wherein said control valve includes a rotary valve operating piston (105).

4. In a fluid power steering system having an engine driven pump (2), servo motor means (3) to which pressurized fluid is conducted from the pump under an operating flow rate that varies as an inverse function of pump operating speed, control valve means (5) displaceable between limit positions from a neutral position for supply of said pressurized fluid to the servo motor means, spring means (27) connected to the control valve means for resisting displacement thereof from the neutral position with a bias that is proportional to said displacement of the control valve means and valve actuating means (28) connected to the control valve means for displacement thereof against the bias of the spring means under a manual effort that is a direct function of said bias; and reaction force control means for varying the quantity flow rate of fluid supplied to the servo motor means, including flow throttling means (25 or 26) connected to the control valve means for controlling flow of the fluid supplied to the servo motor means as a direct function of said displacement of the control valve means, whereby the manual effort required for displacement of the control valve means is limited to substantially the same maximum value throughout the operating speed range of the pump.

5. The combination of claim 4, wherein said control valve means includes a valve body having inlet and outlet ports respectively connected to the pump and the servo motor means and exhaust ports, and a valve element connected to the valve actuating means and displaceable from the neutral position to block one of the exhaust ports, said flow throttling means including regulating surface formations on the valve element forming variable flow passages between the inlet and exhaust passages, said flow passages being fully blocked in said limit positions of the valve element.

* * * * *